Nov. 17, 1953  E. F. NORELIUS  2,659,246
TANDEM DRIVE MECHANISM
Filed March 25, 1949  2 Sheets-Sheet 1
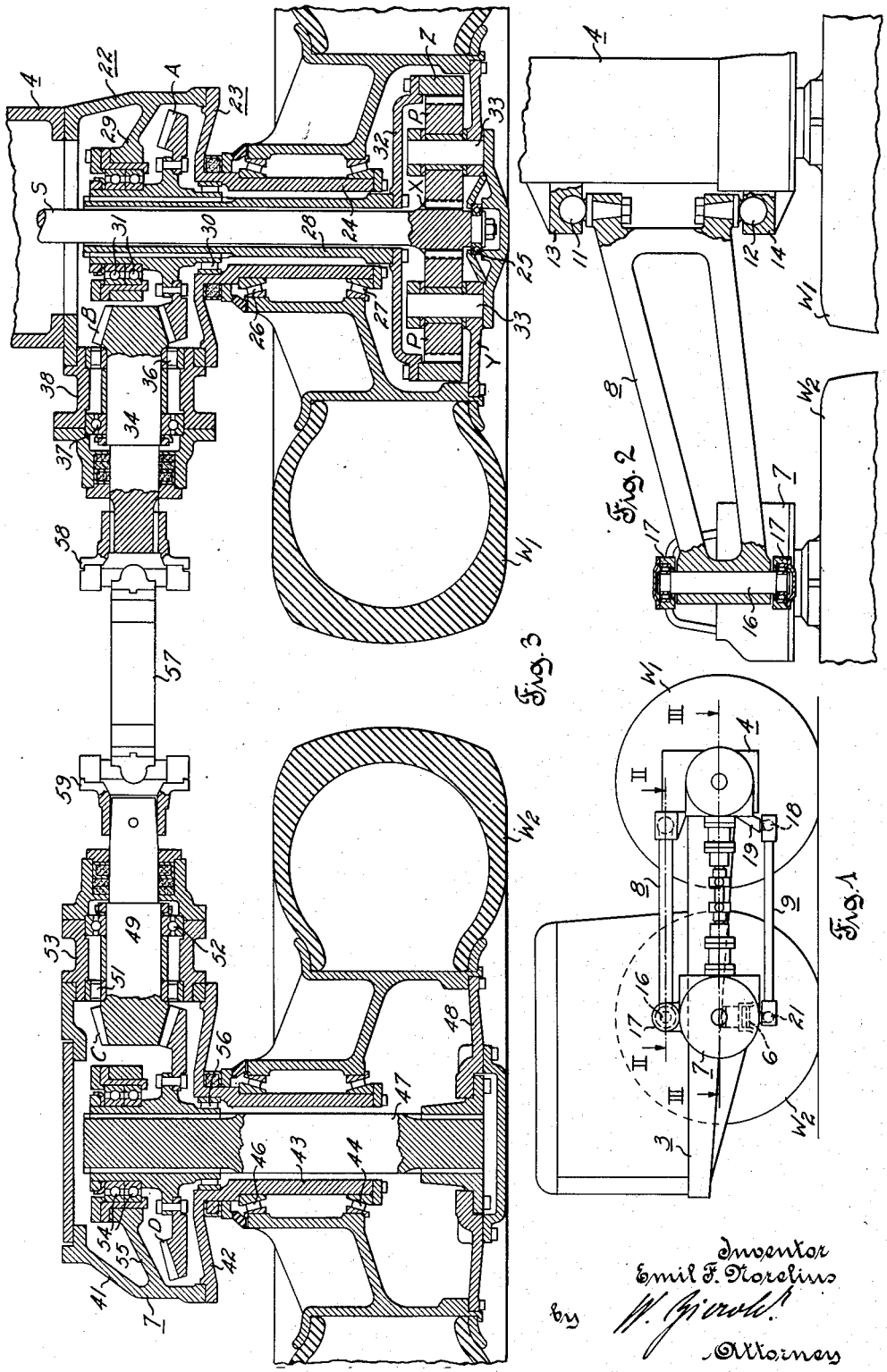
Inventor
Emil F. Norelius
by
Attorney Nov. 17, 1953  E. F. NORELIUS  2,659,246
TANDEM DRIVE MECHANISM
Filed March 25, 1949  2 Sheets-Sheet 2

Inventor
Emil F. Norelius
by
Attorney

Patented Nov. 17, 1953

2,659,246

UNITED STATES PATENT OFFICE 2,659,246

TANDEM DRIVE MECHANISM

Emil F. Norelius, Springfield, Ill., assignor to Allis-Chalmers Manufacturing Company, Milwaukee, Wis., a corporation of Delaware Application March 25, 1949, Serial No. 83,361

24 Claims. (Cl. 74—710)

The invention relates to vehicle running gear, and it is concerned more particularly with a multiple wheel drive for motor vehicles.

Differential mechanisms for transmitting power from the engine to the propelling wheels of a motor vehicle are usually employed in such a manner that the entire differential, that is, the two half shaft gears and the spider on which the planet pinions are mounted rotate as a unit during straight ahead drive of the motor vehicle, the driving power being usually applied to the spider, and the gear ratio between the half shaft gears, at zero speed of the spider, being equal to unity so that there will be no relative rotation between these gears while the wheels are driven at equal speeds in the same direction.

While the use of such a differential mechanism is a universally adopted practice in motor vehicles having the usual two propelling wheels at the rear, its use has also been proposed for tandem drive motor vehicles in which a pair of power driven tandem wheels is mounted at each side of the vehicle body. In that case, as disclosed for instance in U. S. Patent 1,713,133, granted May 14, 1929, to J. R. Junkin for Multiple Wheel Drive, the engine power is applied to the spider of a main differential of the hereinabove mentioned character, and the half shafts of the main differential are connected, respectively, with the spiders of two auxiliary differentials of the same character, the half shaft gears of one of the auxiliary differentials being connected, respectively, with the tandem wheels at one side of the vehicle, and the half shaft gears of the other auxiliary differential being connected, respectively, with the tandem wheels at the other side of the vehicle.

Generally, it is an object of the invention to provide an improved drive mechanism for a pair of vehicle wheels, in which an epicyclic gear train for transmitting propelling power to the wheels not only serves as a differential between the wheels but also as a transmission gearing between a drive shaft and the wheels, whose gear ratio is different from unity, and which will be operative to drive both wheels simultaneously in the same direction.

More specifically, it is an object of the invention to provide an improved drive mechanism of the hereinabove stated character which will be operative to drive both wheels simultaneously in such a manner that the rim speed and the rim pull of one of the simultaneously driven wheels will be equal, or substantially equal, to the rim speed and the rim pull of the other of the simultaneously driven wheels.

A further object of the invention is to provide an improved differential and drive gearing for a pair of vehicle wheels, which will permit differential rotation of the wheels and transmit rotation of the drive shaft at a reduced speed simultaneously to both wheels.

A further object of the invention is to provide an improved differential and drive gearing of the hereinabove stated character, in which the total gear reduction between the drive shaft and both wheels is twice as large as the gear reduction which obtains between the drive shaft and one of the wheels when the other wheel is locked against rotation.

A further object of the invention is to provide an improved differential and drive gearing for a pair of vehicle wheels which, in addition to accomplishing all of the foregoing objects, will be relatively simple and compact, and which may be manufactured at relatively low costs.

Briefly and specifically, the improved multiple-wheel drive mechanism, as contemplated by the invention, comprises an epicyclic gear train of the type in which three relatively rotatable power transmitting elements forming a sun gear, a countergear, and a spider, respectively, are operatively interconnected by planet pinions on the spider so that the gear ratio between said sun and countergears, at zero speed of the spider, is different from unity; and suitably constructed driving connections of said three power transmitting elements with a drive shaft, and with one and the other of a pair of vehicle wheels, respectively. The epicyclic gear train is preferably so constructed that the gear ratio between the sun gear and the countergear, at zero speed of the spider, is larger than unity, and the gear ratio between the drive shaft and one of the wheels is preferably equal, or substantially equal, to the gear ratio between the drive shaft and the other of the wheels.

These and other objects and advantages are attained by the present invention, various novel features of which will be apparent from the description herein and accompanying drawings, and will be more particularly pointed out in the appended claims.

In the drawings:

Fig. 1 is a diagrammatic side view of a four wheel drive tractor, front and rear wheels at the near side of the tractor being omitted for purposes of exposure;

Fig. 2 is a top view of a link and other parts at the near side of the tractor shown in Fig. 1, portions of the link and associated parts in Fig. 2 being shown in section on line II—II of Fig. 1;

Fig. 3 is a sectional view, on line III—III in Fig. 1, of a tandem drive mechanism at the near side of the tractor shown in Fig. 1;

Figure 7:
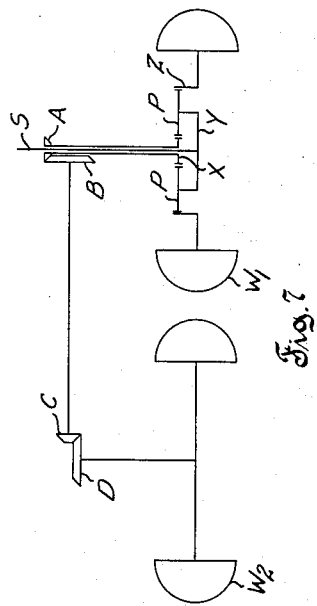
Figs. 5 to 9 illustrate five modifications, respectively, of the mechanism shown in Fig. 3, the showing of the parts in each of Figs. 5 to 9 being diagrammatic and analogous to that of Fig. 4.

Referring to Fig. 1, a pair of tandem wheels $W_1$ and $W_2$ at the far side of the tractor, and a corresponding pair of tandem wheels at the near side of the tractor, shown in Figs. 2 and 3, support a main body 3 in an elevated position above the ground, the rear tandem wheels $W_1$ being rotatably mounted at the opposite ends of a transverse rear axle housing 4, which forms part of the main body 3, and a transverse leaf spring 6 being pivoted at its center on the main body 3 and sustained at its opposite ends by the front tandem wheels $W_2$. As shown in Fig. 1, a support 7 for the near front tandem wheel $W_2$ is connected with the rear axle housing 4 by means of an upper link 8 and a lower link 9, and a corresponding support 7 (not shown) is similarly connected by means of an upper and a lower link to the rear axle housing 4 at the far side of the tractor for mounting the other front tandem wheel $W_2$, the transverse leaf spring 6 being suitably connected at its opposite ends in load transmitting relation with the wheel supports 7, respectively, at the opposite sides of the tractor.

Referring to Fig. 2, the upper link 8 is constructed in the form of a tapered frame having a relatively wide rear end and a narrow front end, ball and socket joints 11 and 12 pivotally connecting the wide rear end of the link 8 with a pair of transversely spaced upper lugs 13 and 14 on the rear axle housing 4, and a transverse pivot pin 16 connecting the narrow front end of the link 8 with a pair of upper lugs 17 on the wheel support 7.

The lower link 9 is preferably constructed in the form of a rod having a ball and socket connection 18 at its rear end with a lower lug 19 of the rear axle housing 4, and a ball and socket connection 21 with a lower lug on the wheel support 7.

From the foregoing description of the construction and mounting of the upper and lower links 8 and 9, it will be seen that the links 8 and 9 at the near side of the tractor connect the wheel support 7 in vertically movable relation with the axle housing 4, and that the wheel support 7 is properly stabilized against toeing in and out and against lateral tilting relative to the main body 3.

The wheel support 7 at the far side of the tractor (not shown) is constructed and mounted in the same manner as the wheel support 7 at the near side of the tractor.

Referring to Fig. 3, an annular casing 22 which forms part of the rear axle housing 4, has a large axial end aperture, and a cover 23 for said aperture is rigidly secured to the casing 22 and has a central hub sleeve 24 which extends axially outward from the casing 22. The rear tandem wheel $W_1$ is rotatably mounted on the hub sleeve 24 in axially fixed position by conical roller bearings 26 and 27. A quill shaft 28 which extends axially through the hub sleeve 24 and which is rotatable relative to the latter and relative to the wheel $W_1$, has a circumferential series of axially extending splines formed at its axially inner end. A bevel gear A is nonrotatably connected with the splined axially inner end of the quill shaft 28 within the casing 22, and the hub of the bevel gear A is rotatably mounted in the cover 23 and in a web 29 of the casing 22 by means of a roller bearing 30 and a double row ball bearing 31.

The rear axle housing 4 encloses a suitable power steering mechanism which is not shown but which, for instance, may be of the type generally used in crawler tractors for effecting steering by controlling the drive to the traction devices at the opposite sides of the tractor body. For a fuller disclosure of a suitable power steering mechanism which may be enclosed in the rear axle housing 4 reference is here made to U. S. Patent 2,533,611, granted on December 12, 1950, to applicant for Controlled Differential Transmission Mechanism.

As shown in Fig. 3, a rotatable drive shaft S extends axially through the quill shaft 28, and the axially outer end of the drive shaft S is mounted on the rear wheel $W_1$ by means of a ball bearing 25 for rotation relative to the rear wheel and relative to the quill shaft 28. The mentioned power steering mechanism, not shown, which is enclosed within the rear axle housing 4, is operable to control the transmission of engine power to the drive shaft S.

Integrally formed with the drive shaft S at the axially outer end of the latter is an externally toothed gear X which forms the sun gear of an epicyclic gear train within the rear wheel $W_1$. A disk Y which is rigidly secured at its outer periphery to the rim of the rear wheel $W_1$ forms the spider of the mentioned epicyclic gear train, and a ring gear Z which is rigidly connected with the axially outer end of the quill shaft 28 by means of a flange structure 32 forms a countergear of the mentioned epicyclic gear train. A circumferential series of studs 33 are secured to the spider Y, and spur gears P which form planet pinions of the mentioned epicyclic gear train are rotatably mounted on the studs 33, each planet pinion meshing with the external teeth of the sun gear X and with the internal teeth of the ring gear Z.

As shown in the upper half of Fig. 3, a line shaft 34 is rotatably mounted on the casing 22 for rotation on an axis at right angles to the axis of the rear wheel $W_1$, the line shaft 34 being rotatably supported in axially fixed position by means of a roller bearing 36 and a ball bearing 37 in an annular bearing support 38 which is rigidly secured to the casing 22 at the forward side of the latter. Integrally formed with the line shaft 34 is a bevel gear B which meshes with the bevel gear A within the casing 22.

The support 7 for the front wheel $W_2$, as shown in Fig. 3, comprises a casing 41 and a cover 42 therefor which has a tubular central hub sleeve 43 on which the front wheel $W_2$ is rotatably mounted in axially fixed position by means of conical roller bearings 44 and 46. An axle shaft 47 for the front wheel $W_2$ extends through the hub sleeve 43 and has a spline connection at its axially outer end with a disk 48 which is secured at its periphery to the rim of the front wheel $W_2$.

Another line shaft 49 is rotatably mounted on the front wheel support 7 for rotation on an axis at right angles to the axis of the front wheel $W_2$, the line shaft 49 being rotatably supported in axially fixed position by means of a roller bearing 51 and a ball bearing 52 in an annular bearing support 53 which is rigidly secured to the casing 41 at the rear side of the latter. Integrally formed with the line shaft 49 is a bevel gear C which meshes with a bevel gear D on the axle shaft 47, the bevel gear D being splined on the axially inner end of the axle shaft 47 within the casing 41 and rotatably supported by means of a double row ball bearing 54 in a web 55 of the casing 41, and by means of a roller bearing 56 in the cover 42.

An intermediate line shaft section 57 is universally connected at its opposite ends with the line shafts 34 and 49, respectively, a universal joint 58 connecting the rear end of the intermediate line shaft section 57 with the forward end of the line shaft 34, and a universal joint 59 connecting the forward end of the intermediate line shaft section 57 with the rear end of the line shaft 49. The forward end of the line shaft 34 has a circumferential series of axially extending splines, and the universal joint 58 is mounted on the splined forward portion of the line shaft 34 for axial back and forth movement relative to the latter. The universal joint 59, on the other hand, is mounted on the rear end of the line shaft 49 in axially fixed position. The line shafts 34 and 49 together with the line shaft section 57 and universal joints 58 and 59 form a shaft connection between the axle housing 4 and the wheel support 7, for driving the front wheel $W_2$, and which shaft connection is flexible and extensible so as to accommodate up and down movement of the wheel support 7 relative to the rear axle housing 4.

It will be understood that the tractor shown in Fig. 1 has a tandem drive mechanism at its far side, not shown, which corresponds to the drive mechanism shown in Fig. 3, and that in operation of the tractor driving power may be applied selectively to the drive shaft S of the tandem drive mechanism at one side, or to the corresponding drive shaft S at the other side, or to both drive shafts simultaneously, in conformity with well known principles.

Considering the operation of the epicyclic gear train X, Y, Z and of the bevel gear train A, B, C, D during propulsion of the tractor, it will be noted that the epicyclic gear train not only serves as a differential between the wheels $W_1$ and $W_2$ but also as a transmission gearing between the drive shaft S and the wheels $W_1$ and $W_2$, whose gear ratio is different from unity. As shown in Fig. 3, the epicyclic gear train X, Y, Z is so proportioned that the gear ratio between the sun gear X and the countergear Z, at zero speed of the spider Y, is larger than unity, and the bevel gear train A, B, C, D, is so proportioned that the gear ratio between the bevel gears A and D is substantially equal to the gear ratio which obtains between the countergear Z and the spider Y at zero speed of the sun gear X. The rim diameter of the wheel $W_1$ is equal to the rim diameter of the wheel $W_2$, and during propulsion of the tractor on level ground the rim speed and the rim pull of the wheel $W_1$ will be substantially equal to the rim speed and rim pull of the wheel $W_2$. When the wheels $W_1$ and $W_2$ are thus driven at the same speed, such speed is substantially lower than the rotary speed of the drive shaft S, the total reduction ratio between the drive shaft S and the wheels $W_1$ and $W_2$ being twice as large as the reduction ratio which obtains between the drive shaft and one of the wheels when the other wheel is locked against rotation. In the mechanism as shown in Fig. 3, the reduction ratio between the drive shaft S and the wheel $W_1$, at zero speed of the wheel $W_2$, is equal to the reduction ratio between the sun gear X and the spider Y, and the total reduction ratio between the drive shaft S and both wheels $W_1$ and $W_2$ is twice the reduction ratio between the sun gear X and the spider Y.

For purposes of further explanation, reference will be made hereinbelow to the tooth numbers of the bevel gears A, B, C and D, and to the tooth numbers of the sun gear X, countergear Z and any of the planet pinions P by the symbols $T_a$, $T_b$, $T_c$, $T_d$, $T_x$, $T_p$ and $T_z$, respectively. Further, the symbol R with two subletters will be used as follows:

$R_{ad}$ to designate the ratio of the speed of the bevel gear A to the speed of the bevel gear D, that is:

$$R_{ad} = \frac{T_d}{T_c} \times \frac{T_b}{T_a} \quad (1)$$

$R_{zy}$ to designate the ratio of the countergear speed to the spider speed at zero speed of the sun gear X, that is:

$$R_{zy} = \frac{T_x + T_z}{T_z} \quad (2)$$

$R_{zx}$ to designate the ratio of the countergear speed to the sun gear speed at zero speed of the spider Y, that is:

$$R_{zx} = \frac{-T_x}{T_z} \quad (3)$$

$R_{xy}$ to designate the ratio of the sun gear speed to the spider speed at zero speed of the countergear Z, that is:

$$R_{xy} = \frac{T_x + T_z}{T_x} \quad (4)$$

$R_{yz}$, $R_{xz}$ and $R_{yx}$ to designate the inverse values of the ratios $R_{zy}$, $R_{zx}$ and $R_{xy}$, respectively.

$R_{xw_1}$, $R_{yw_1}$ and $R_{zw_1}$ to designate the gear ratios which obtain between the sun gear X, spider Y and countergear Z, respectively, and the rear tandem wheel $W_1$, at zero speed of the front tandem wheel $W_2$;

$R_{xw_2}$, $R_{yw_2}$ and $R_{zw_2}$ to designate the gear ratios which obtain between the sun gear X, the spider Y and the countergear Z, respectively, and the front tandem wheel $W_2$ at zero speed of the rear tandem wheel $W_1$; and $R_{sw_1}$ and $R_{sw_2}$ to designate, respectively, the gear ratio between the drive shaft S and the rear wheel $W_1$ at zero speed of the front wheel $W_2$, and the gear ratio between the drive shaft S and the front wheel $W_2$ at zero speed of the rear wheel $W_1$.

Figure 4:
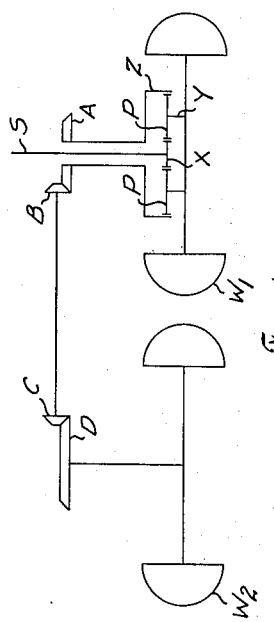
Fig. 4 is a diagram of the tandem drive mechanism shown in Fig. 3.

The mechanism as shown in Fig. 3 and as diagrammatically shown in Fig. 4, is so constructed that:

$$R_{zw_1} = \text{ or } \approx R_{zw_2} \quad (5)$$

Since the rear wheel $W_1$ is rigid with the spider Y, and the bevel gear A is rigid with the ring gear Z it follows that:

$$R_{zw_1} = R_{zy} \text{ and } R_{zw_2} = R_{cd}$$

and from Equation 5:

$$R_{ad} = \text{ or } \approx R_{zy} \quad (6)$$

Figure 5:
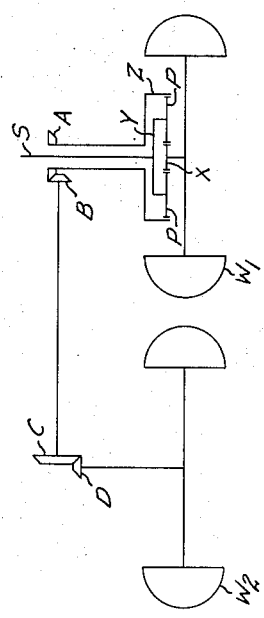

In the modification of the mechanism as diagrammatically shown in Fig. 5, the drive shaft S is connected in driving relation with the spider Y, the sun gear X is rigidly secured to the rear wheel $W_1$ and the countergear Z is connected through the bevel gear train A, B, C, D with the front wheel $W_2$. The modified mechanism of Fig. 5 is so constructed that:

$$R_{zw_1}= \text{ or } \approx R_{zw_2} \qquad (5)$$

Since the wheel $W_1$ is rigid with the sun gear $X$, and the bevel gear $A$ is rigid with the ring gear $Z$, it follows that:

$$R_{zw_1}=R_{zx} \text{ and } R_{zw_2}=R_{ad}$$

and from Equation 5:

$$R_{ad}= \text{ or } \approx R_{zx} \qquad (7)$$

Figure 6:
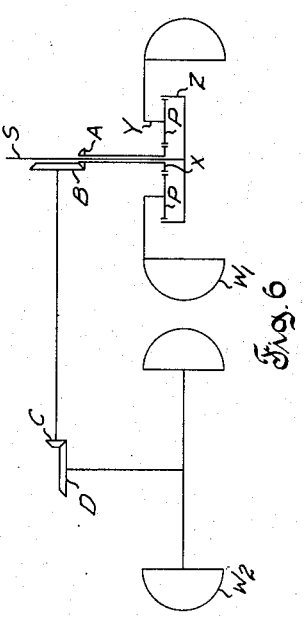

In the modification of the mechanism as shown in Fig. 6, the driving power is applied to the countergear $Z$, the spider is rigidly connected to the rear wheel $W_1$ and the sun gear $X$ is connected with the front wheel $W_2$ through the bevel gear train $A$, $B$, $C$, $D$. The modified mechanism as shown in Fig. 6 is so constructed that:

$$R_{xw_1}= \text{ or } \approx R_{xw_2} \qquad (8)$$

Since the rear wheel $W_1$ is rigid with the spider $Y$, and the bevel gear $A$ is rigid with the sun gear $X$, it follows that:

$$R_{xw_1}=R_{xy} \text{ and } R_{xw_2}= \text{ or } \approx R_{ad}$$

and from the Equation 8:

$$R_{ad}= \text{ or } \approx R_{xy} \qquad (9)$$

In the modification of the mechanism as shown in Fig. 7, the driving power is applied to the spider $Y$, the ring gear $Z$ is rigidly connected with the rear wheel $W_1$, and the sun gear $X$ is connected with the front wheel $W_2$ through the bevel gear train $A$, $B$, $C$, $D$. The modified mechanism as shown in Fig. 7, is so constructed that:

$$R_{xw_1}= \text{ or } \approx R_{xw_2} \qquad (8)$$

Since the ring gear $Z$ is rigidly connected with the rear wheel $W_1$, and the bevel gear $A$ is rigid with the sun gear $X$, it follows that:

$$R_{xw_1}=R_{xz} \text{ and } R_{xw_2}=R_{ad}$$

and from Equation 8:

$$R_{ad}= \text{ or } \approx R_{xz} \qquad (10)$$

Figure 8:
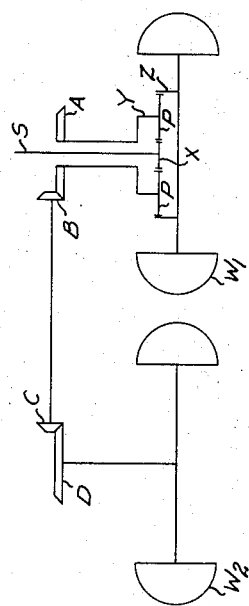

In the modified mechanism as shown in Fig. 8, the driving power is applied to the sun gear $X$, the ring gear $Z$ is rigidly connected with the rear wheel $W_1$, and the spider $Y$ is connected with the front wheel $W_2$ through the bevel gear train $A$, $B$, $C$, $D$. The modified mechanism shown in Fig. 8 is so constructed that:

$$R_{yw_1}= \text{ or } \approx R_{yw_2} \qquad (11)$$

Since the ring gear $Z$ is rigidly connected with the rear wheel $W_1$, and the bevel gear $A$ is rigid with the spider $Y$, it follows that:

$$R_{yw_1}=R_{yz} \text{ and } R_{yw_2}=R_{ad}$$

and from Equation 11:

$$R_{ad}= \text{ or } \approx R_{yz} \qquad (12)$$

Figure 9:
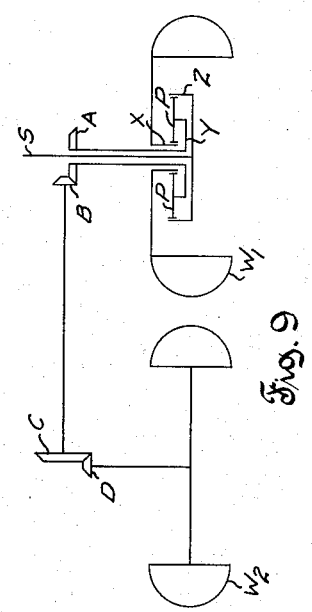

In the modified mechanism as shown in Fig. 9, the driving power is applied to the countergear $Z$, the sun gear $X$ is rigidly connected with the rear wheel $W_1$, and the spider $Y$ is connected with the front wheel $W_2$ through the bevel gear train $A$, $B$, $C$, $D$. The mechanism shown in Fig. 9 is so constructed that:

$$R_{yw_1}= \text{ or } \approx R_{yw_2} \qquad (11)$$

Since the sun gear $X$ is rigidly connected with the rear wheel $W_1$, and the bevel gear $A$ is rigid with the spider $Y$, it follows that:

$$R_{yw_1}=R_{yx} \text{ and } R_{yw_2}=R_{ad}$$

and from Equation 11:

$$R_{ad}= \text{ or } \approx R_{yx} \qquad (13)$$

As a practical example, the epicyclic gear train in each of Figs. 4 to 9 may be assumed to have the following tooth numbers:

$$T_x=15; \quad T_p=33; \quad T_z=81$$

With these assumptions, representative gear data for the mechanisms shown in Figs. 4 to 9 may be tabulated as follows:

| Fig. | Epicyclic Gear Train | Bevel Gear Train | | | | | Total Reduction Ratio |
|---|---|---|---|---|---|---|---|
| | | $T_a$ | $T_b$ | $T_c$ | $T_d$ | $R_{ad}$ | |
| 4 | $R_{xy}=\frac{T_x+T_z}{T_z}=1.1851$ | 48 | 16 | 16 | 57 | 1.1875 | $2R_{xy}=12.8$ |
| 5 | $R_{xz}=\frac{T_x}{T_z}=.1851$ | 30 | 13 | 30 | 13 | .1877 | $2R_{yz}=.312$ |
| 6 | $R_{xy}=\frac{T_x+T_z}{T_x}=6.4$ | 13 | 33 | 13 | 33 | 6.4437 | $2R_{xy}=2.37$ |
| 7 | $R_{xz}=\frac{T_z}{T_x}=5.4$ | 13 | 30 | 13 | 30 | 5.325 | $2R_{yz}=1.687$ |
| 8 | $R_{yz}=\frac{T_z}{T_x+T_z}=.8437$ | 57 | 16 | 16 | 48 | .8421 | $2R_{xz}=10.8$ |
| 9 | $R_{yx}=\frac{T_x}{T_x+T_z}=.1562$ | 33 | 13 | 33 | 13 | .1551 | $2R_{xz}=.370$ |

It will be noted that each of the mechanisms shown in Figs. 4 to 9, inclusive, incorporates an epicyclic gear train of the type in which three relatively rotatable power transmitting elements forming a sun gear $X$, a countergear $Z$ and a spider $Y$, respectively, are operatively interconnected by planet pinion means on the spider and in which said sun gear, countergear and planet pinion means are constructed so that the gear ratio between a first and a second of said power transmitting elements, at zero speed of the third of said power transmitting elements, is different from unity, as shown in the hereinabove tabulated ratio equations for the epicyclic gear train; that in each of the mechanisms shown in Figs. 4 to 9 the drive shaft $S$ is connected in driving relation with said third power transmitting element; that each of the mechanisms includes a driving connection, independent of said first and third power transmitting elements, between said second power transmitting element and one of the wheels $W_1$, $W_2$, and that each of the mechanisms includes a fixed ratio gearing $A$, $B$, $C$, $D$ connecting said first power transmitting element in speed changing driving relation with the other of the wheels $W_1$, $W_2$. It will further be noted that in each of the mechanisms shown in Figs. 4 to 9, inclusive, the epicyclic gear train, the mentioned driving connection, and the fixed ratio gearing $A$, $B$, $C$, $D$ are so constructed that the gear ratio between said third power transmitting element and said one vehicle wheel is equal or substantially equal to the gear ratio between said third power transmitting element and said other vehicle wheel, that is, each of the mechanisms shown in Figs. 4 to 9, inclusive, meets the following condition:

$$R_{sw_1}= \text{ or } \approx R_{sw_2} \qquad (14)$$

It will further be noted that in each of the mechanisms shown in Figs. 4 to 9, the second mentioned power transmitting element of the epicyclic gear train $X$, $Y$, $Z$ is rigidly secured to the wheel $W_1$ and therefore the transmission ratio between said second power transmitting element and one of the wheels is equal to unity.

Further, in each of the mechanisms shown in Figs. 4 to 9, the epicyclic gear train, X, Y, Z; the wheels $W_1$, $W_2$; the mentioned driving connections; the fixed ratio gearing; and the wheels are so constructed that upon application of a predetermined driving force to the shaft S, the rim speed and the rim pull of one of the wheels, at zero speed of the other, will be equal or substantially equal to the rim speed and rim pull of said other wheel at zero speed of said one wheel.

From the tabulated gear data hereinabove, it is further apparent that the mechanisms shown in Figs. 4, 6, 7 and 8 each afford a total gear reduction between the drive shaft S and both wheels $W_1$ and $W_2$ which is larger than unity, and that, on the other hand, each of the mechanisms shown in Figs. 5 and 9 affords a total gear ratio between the drive shaft S and both tandem wheels, which is smaller than unity. In other words, the mechanisms shown in Figs. 4, 6, 7 and 8 afford a reduction gearing between the drive shaft S and both tandem wheels, whereas the mechanisms shown in Figs. 5 and 9 afford an overdrive between the drive shaft S and both tandem wheels. It will further be noted that in each of the mechanisms shown in Figs. 4, 6 and 8 the gear ratios $R_{xz}$, $R_{sw_1}$ and $R_{sw_2}$ are each larger than unity.

From Figs. 4, 6, 8 and 9, it will further be noted that in each of the mechanisms shown in these figures the bevel gear train A, B, C, D serves as a reverse gearing between one of the power transmitting elements of the epicyclic gear train X, Y, Z and the front wheel $W_2$, while another of said power transmitting elements of the epicyclic gear train is rigidly secured to the rear wheel $W_1$. In other words, the rear wheel $W_1$ in each of Figs. 4, 6, 8 and 9 has a nonreversing driving connection with its respective driving element of the epicyclic gear train, while the front wheel $W_2$ has a reversing driving connection with its respective driving element of the epicyclic gear train.

As distinguished from the bevel gear trains A, B, C, D, in Figs. 4, 6, 8 and 9, each of which affords a reversing driving connection as pointed out hereinbefore, the bevel gear trains A, B, C, D in each of Figs. 5 and 7 are so arranged as to afford a nonreversing drive connection between one power transmitting element of the epicyclic gear train and the front wheel $W_2$, and another nonreversing driving connection is operatively interposed, in Figs. 5 and 7, between another of the power transmitting elements of the epicyclic gear train and the rear wheel $W_1$.

It should be understood that it is not intended to limit the invention to the exact details of construction herein shown and described for various modifications within the scope of the appended claims may occur to persons skilled in the art.

It is claimed and desired to secure by Letters Patent:

1. A differential and drive gearing for a pair of vehicle wheels comprising, in combination, an epicyclic gear train of the type in which three relatively rotatable power transmitting elements forming a sun gear, a countergear and a spider, respectively, are operatively interconnected by planet pinion means on said spider and in which said sun gear, countergear and planet pinion means are constructed so that the gear ratio between a first and a second of said power transmitting elements, at zero speed of the third power transmitting element, is different from unity, a rotatable drive shaft connected in driving relation with said third power transmitting element, a driving connection, independent of said first and third power transmitting elements, between said second power transmitting element and one of said vehicle wheels, and fixed ratio gearing connecting said first power transmitting element in speed changing driving relation with the other of said vehicle wheels, said fixed ratio gearing being constructed so as to afford a gear ratio between said first power transmitting element and said other vehicle wheel equal, or substantially equal, to the gear ratio which exists between said first power transmitting element and said one vehicle wheel at zero speed of said drive shaft.

2. A differential and drive gearing as set forth in claim 1, in which said epicyclic gear train, said driving connection and said fixed ratio gearing are so constructed that the gear ratio between said third power transmitting element and said one vehicle wheel at zero speed of the other vehicle wheel is equal or substantially equal to the gear ratio between said third power transmitting element and said other vehicle wheel at zero speed of said one vehicle wheel.

3. A differential and drive gearing as set forth in claim 1, in which said driving connection is constructed to afford a transmission ratio equal to unity between said second power transmitting element and said one vehicle wheel.

4. A differential and drive gearing as set forth in claim 1, in which said epicyclic gear train is so constructed that the gear ratio between said sun and countergears, at zero speed of said spider, is larger than unity.

5. A differential and drive gearing as set forth in claim 1, in which said driving connection and said fixed ratio gearing are constructed to afford relatively different transmission ratios, respectively, between said second power transmitting element and said one vehicle wheel, and between said first power transmitting element and said other vehicle wheel.

6. A differential and drive gearing as set forth in claim 5, in which said epicyclic gear train, said driving connection, said fixed ratio gearing, and said wheels are so constructed that upon application of a predetermined driving force to said third power transmitting element, the rim pull and rim speed of said one wheel at zero speed of the other, will be equal or substantially equal to the rim pull and rim speed of said other wheel at zero speed of said one wheel.

7. A differential and drive gearing as set forth in claim 1, in which said epicyclic gear train, said driving connection, and said fixed ratio gearing are constructed so that the gear ratio between said sun and countergears at zero speed of said spider, the gear ratio between said drive shaft and said one vehicle wheel at zero speed of the other, and the gear ratio between said drive shaft and said other vehicle wheel at zero speed of said one vehicle wheel, are each larger than unity.

8. A differential and drive gearing as set forth in claim 7, in which the gear ratio between said drive shaft and said one vehicle wheel, at zero speed of the other, is equal or substantially equal to the gear ratio between said drive shaft and said other vehicle wheel at zero speed of said one vehicle wheel.

9. A differential and drive gearing for a pair of vehicle wheels comprising, in combination, an epicyclic gear train of the type in which a sun gear, a countergear and a spider are operatively interconnected by planet pinion means on said spider, a rotatable drive shaft connected in driving relation with one of said sun and countergears, a driven element connected for rotation in unison with the other of said sun and countergears, another driven element connected for rotation in unison with said spider; a driving connection independent of said epicyclic gear train, between one of said driven elements and one of said vehicle wheels, and fixed ratio gearing independent of said epicyclic gear train, connecting the other of said driven elements in speed changing driving relation with the other of said vehicle wheels, said driving connection and fixed ratio gearing being constructed and said sun gear, countergear and planet pinion means being proportioned so that the gear ratio which exists between said drive shaft and said one vehicle wheel at zero speed of said other vehicle wheel is equal or substantially equal to the gear ratio which exists between said drive shaft and said other vehicle wheel at zero speed of said one vehicle wheel.

10. A differential and drive gearing as set forth in claim 9, in which the gears of said epicyclic gear train are so constructed that the gear ratio between said sun and countergears, at zero speed of said spider, is larger than unity.

11. A differential and drive gearing for a pair of vehicle wheels comprising, in combination, an epicyclic gear train of the type in which three relatively rotatable power transmitting elements forming a sun gear, a countergear and a spider, respectively, are operatively interconnected by planet pinion means on said spider and in which said sun gear, countergear and planet pinion means are constructed so that upon application of a predetermined driving speed in a predetermined direction to said sun gear, at zero speed of said spider, said countergear will be driven at a slower speed in the opposite direction, a non-reversing driving connection between a first of said power transmitting elements and one of said vehicle wheels, and fixed ratio, speed changing, reverse gearing operatively interposed between a second of said power transmitting elements and the other of said vehicle wheels, and a rotatable drive shaft connected in driving relation with the third of said power transmitting elements, said driving connection and said fixed ratio gearing being so constructed, and said sun gear, countergear and planet pinion means being so proportioned that the gear ratio which exists between said third power transmitting element and said one vehicle wheel, at zero speed of the other of said vehicle wheels, is equal or substantially equal to the gear ratio which exists between said third power transmitting element and said other vehicle wheel at zero speed of said one vehicle wheel.

12. A differential and drive gearing as set forth in claim 11, in which said rotatable drive shaft is connected in driving relation with said sun gear.

13. A differential and drive gearing as set forth in claim 11, in which said rotatable drive shaft is connected in driving relation with said countergear.

14. A differential and drive gearing as set forth in claim 11, in which said rotatable drive shaft is connected in driving relation with said sun gear, and in which said reverse gearing is operatively interposed between said countergear and said other vehicle wheel.

15. A differential and drive gearing as set forth in claim 11, in which said rotatable drive shaft is connected in driving relation with said sun gear, and in which said reverse gearing is operatively interposed between said spider and said other vehicle wheel.

16. A differential and drive gearing as set forth in claim 11, in which said rotatable drive shaft is connected in driving relation with said countergear, and in which said reverse gearing is operatively interposed between said spider and said other vehicle wheel.

17. A tandem drive mechanism comprising, in combination, a support, a pair of vehicle wheels operatively mounted on said support in tandem relation to each other, a quill shaft mounted on said support coaxially with one of said wheels for rotation relative to the latter and relative to said support, a rotatable drive shaft extending through said quill shaft, a drive gear secured to said drive shaft in nonrotatable relation thereto, planetary pinion means in mesh with said drive gear, power transmitting means comprising a rotatable ring gear coaxial with said drive shaft and in mesh with said planetary pinion means, other power transmitting means comprising a support for said planetary pinion means rotatable about the axis of said drive shaft, one of said power transmitting means being secured to said one wheel for rotation in unison therewith, and the other of said power transmitting means being secured to said quill shaft for rotation in unison therewith, and a speed changing reverse driving connection between said quill shaft and the other of said wheels, affording a gear ratio between said quill shaft and said other wheel equal, or substantially equal, to the gear ratio which exists between said quill shaft and said one vehicle wheel at zero speed of said drive shaft.

18. A tandem drive mechanism comprising, in combination, a support, a pair of vehicle wheels operatively mounted on said support in tandem relation to each other, a quill shaft mounted on said support coaxially with one of said wheels, for rotation relative to the latter and relative to said support, a rotatable drive shaft extending through said quill shaft, an externally toothed drive gear secured to said drive shaft, an internally toothed ring gear secured to said quill shaft, planetary pinion means rotatably mounted on said one wheel and in meshing relation with said drive and ring gears, and a speed reducing reverse driving connection between said quill shaft and the other of said wheels, affording a gear ratio between said quill shaft and said other vehicle wheel equal, or substantially equal, to the gear ratio which exists between said quill shaft and said one vehicle wheel at zero speed of said drive shaft.

19. A tandem drive mechanism comprising, in combination, a support, a pair of vehicle wheels mounted on said support for rotation on axes, respectively, spaced transversely from each other, an epicyclic gear train of the type in which three relatively rotatable power transmitting elements forming a sun gear, a countergear and a spider, respectively, are operatively interconnected by planet pinion means on said spider, and in which said sun gear, countergear and planet pinion means are constructed so that the gear ratio between said sun and countergears, at zero speed of said spider, is larger than unity, a quill shaft rotatably mounted on said support in coaxial and rotatively loose relation to one of said vehicle wheels and secured for rotation in unison with a first of said power transmitting elements, means securing a second of said power transmitting elements for rotation in unison with said one vehicle wheel, a drive shaft extending through and rotatable relative to said quill shaft and nonrotatably secured to the third of said power transmitting elements; a first pair of intermeshing gears, one nonrotatably and coaxially secured to said quill shaft, and the other mounted on said support for rotation on an axis extending angularly relative to said wheel axes; a second pair of intermeshing gears, one nonrotatably and coaxially secured to the other of said vehicle wheels, and the other mounted on said support for rotation on an axis extending angularly relative to said wheel axes; and shafting connected in driven relation with said other gear of said first pair and in driving relation with said other gear of said second pair; said first and second pairs of intermeshing gears being constructed so that the gear ratio between said one gear of said first pair and said one gear of said second pair is equal or substantially equal to the gear ratio which exists between said first and second power transmitting elements of said epicyclic gear train at zero speed of the third of said power transmitting elements.

20. A tandem drive mechanism as set forth in claim 19, in which said countergear, spider and sun gear are nonrotatably secured, respectively, to said quill shaft, one vehicle wheel, and drive shaft, and in which said first and second pairs of intermeshing gears are constructed to afford a reversing driving connection between said quill shaft and said other vehicle wheel.

21. A tandem drive mechanism as set forth in claim 19 in which said countergear, spider and sun gear are nonrotatably secured, respectively, to said drive shaft, one vehicle wheel, and quill shaft, and in which said first and second pairs of intermeshing gears are constructed to afford a reversing drive connection between said quill shaft and said other vehicle wheel.

22. A tandem drive mechanism as set forth in claim 19, in which said countergear, spider and sun gear are nonrotatably secured, respectively, to said one vehicle wheel, drive shaft and quill shaft, and in which said first and second pairs of intermeshing gears are constructed to afford a nonreversing driving connection between said quill shaft and said other vehicle wheel.

23. A tandem drive mechanism as set forth in claim 19, in which said countergear, spider and sun gear are nonrotatably secured, respectively, to said one vehicle wheel, quill shaft and drive shaft, and in which said first and second pairs of intermeshing gears are constructed to afford a reversing driving connection between said quill shaft and said other vehicle wheel.

24. A tandem drive mechanism as set forth in claim 19, in which said countergear, spider and sun gear are nonrotatably secured, respectively, to said drive shaft, quill and one vehicle wheel, and in which said first and second pairs of intermeshing gears are constructed to afford a reversing driving connection between said quill shaft and said other vehicle wheel.

EMIL F. NORELIUS.

References Cited in the file of this patent

UNITED STATES PATENTS

| Number | Name | Date |
|---|---|---|
| 1,643,476 | Thorp | Sept. 27, 1927 |
| 1,817,028 | Brockway | Aug. 4, 1931 |
| 1,850,568 | Ruggles | Mar. 22, 1932 |
| 1,891,642 | Harrison | Dec. 20, 1932 |
| 1,897,934 | Hallett | Feb. 14, 1933 |
| 2,027,218 | Armington | Jan. 7, 1936 |
| 2,047,050 | Armington | July 7, 1936 |
| 2,120,594 | Alden | June 14, 1938 |
| 2,126,960 | Higbee | Aug. 16, 1938 |
| 2,306,856 | Ash | Dec. 29, 1942 |
| 2,309,441 | Cook | Jan. 26, 1943 |

FOREIGN PATENTS

| Number | Country | Date |
|---|---|---|
| 271,718 | Great Britain | June 2, 1927 |
| 282,017 | Great Britain | May 3, 1928 |
| 295,820 | Great Britain | Aug. 23, 1928 |